Jan. 29, 1974    F. Y. SOLIMAN    3,788,923

SILICA-FILLED, HIGH MOLECULAR WEIGHT POLYOLEFIN

Filed Aug. 24, 1971    2 Sheets-Sheet 1

INVENTOR.
FRANK Y. SOLIMAN
BY:

*Arthur J. Plantamura*
ATTORNEY.

Jan. 29, 1974   F. Y. SOLIMAN   3,788,923
SILICA-FILLED, HIGH MOLECULAR WEIGHT POLYOLEFIN
Filed Aug. 24, 1971   2 Sheets-Sheet 2
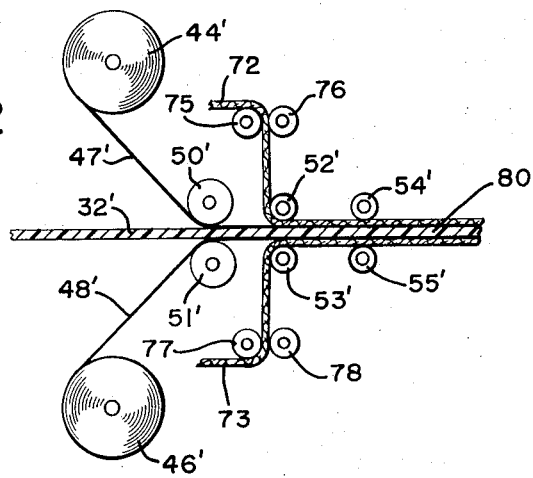
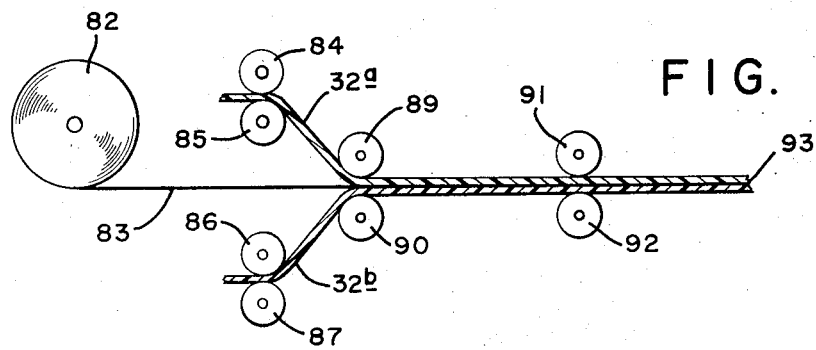
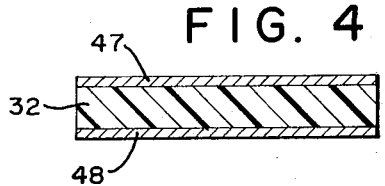
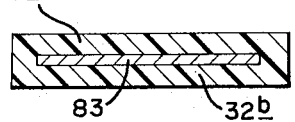
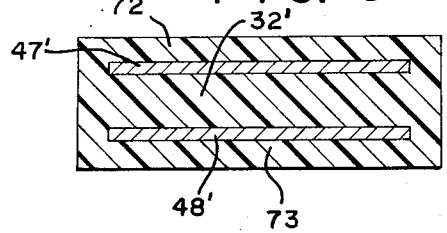
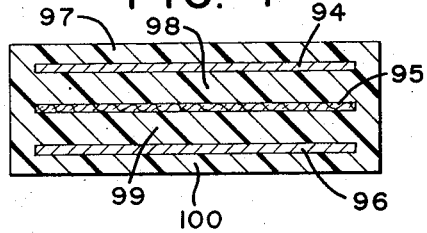
INVENTOR.
FRANK Y. SOLIMAN
BY:
Arthur J. Plantamura
ATTORNEY.

United States Patent Office 3,788,923
Patented Jan. 29, 1974

3,788,923
SILICA-FILLED, HIGH MOLECULAR WEIGHT
POLYOLEFIN
Frank Yassin Soliman, Morristown, N.J., assignor to
Allied Chemical Corporation, New York, N.Y.
Filed Aug. 24, 1971, Ser. No. 174,446
Int. Cl. B29c 19/00; B32b 31/00
U.S. Cl. 156—244                                           17 Claims

ABSTRACT OF THE DISCLOSURE

This invention relates to the production of low cost, reinforced thermoplastic sheets that are characterized by rigidity and strength. The sheets may be formed into various structural shapes using conventional metal-forming techniques. The sheet product, which comprises as the major constituent a silica-filled, medium or high density polyolefin with high or extra-high molecular weight, e.g., polyethylene, with silica as a filler may be used without any additional reinforcement. However, the sheet can also be laminated with steel cloth, sheet steel or steel foil, fiber glass mat, fiber glass cloth, etc., for additional strength and stiffness. The reinforcing sheets are assembled with the filled thermoplastic sheet at a temperature above the softening point of the thermoplastic such that the assembly remains intact after the processing pressure is eliminated. The thermoplastic sheet product exhibits improved load bearing characteristic with lower elongation in comparison to the unfilled polymeric material alone. The impact characteristics of the filled system is higher than other filled plastic sheets. The corrosion resistance, ease of cleanability, the negligible amount of water absorption, and the high mechanical properties of the plastic sheets, especially at sub-zero temperature environment, promote their use in several structural applications; for example, in forming structural shapes such as for the transportation of goods, e.g., pallets, for shipping containers, truck-trailer flooring, and the like.

BACKGROUND OF THE INVENTION

The reinforcement of polymeric materials by inorganic particulate fillers, as distinguished from fibrous reinforcements, has at least one important feature and that is a substantial cost-saving. This feature becomes all the more attractive when the introduced filler improves the processibility and the physical properties of the plastic polymer.

Many efforts in the past have been made to compound various types of fillers into thermoplastic, as well as thermoset, polymers. The results generally indicated that inorganic fillers have a reinforcing effect in many plastic resins.

In the case of polyolefin polymers, of which polyethylene will be considered as typical, the characteristics of the filled compound depend upon the molecular weight and density of the polymer used, as well as on the type and concentration of the filler. For example, prior attempts have been made to fill medium molecular weight polyethylene (with melt index of 1.5-2.4 grams/10 min.) with several types of fillers. The resulting physical properties of the compound, however, were not improved and in many cases deteriorated.

On the other hand, very high molecular weight polyethylene tends to become very brittle when filled with even a small percentage of added filler. Also, this type of very high molecular weight polyethylene is quite difficult to process although the ductility of the filled polyethylene may be improved by using a compatible plasticizer.

In general, however, very high molecular weight polyolefins are not very compatible with many plasticizers, especially with the polar types.

The proper choice of the type of filler and the type of plasticizer to be used with the very high molecular weight polymer, e.g., polyethylene having higher than half a million molecular weight, can be converted into a thermoplastic compound with good flexibility and extensibility characteristics. A high percentage of filler loading can also be achieved while improving the processibility of the compound.

SUMMARY OF THE INVENTION

This invention relates to filling high to extra-high molecular weight polyolefins (as measured by intrinsic viscosity method), typically linear polyethylene, by the inclusion therein of particulate material. The compounded material is obtained by incorporating a particulate silica filler with controlled particle size and particle-size distribution into a blend of the polyolefin preferably in combination with small amounts, generally less than 10%, of an elastomer such as polyisobutylene polymer. The resulting compound possesses improved mechanical properties in comparison to unfilled polyethylene resin. The compound is also homogeneous, isotropic in nature, and the filler is easily distributed through the polymers resulting in thermoplastic sheets of uniform density throughout. The functional characteristics of the elastomeric polymer, e.g., the polyisobutylene polymer, is mainly to improve the impact characteristics, as well as the flexibility, of the resulting sheet product.

A particular combination of properties such as the tensile or compressive yield strength and elongation, flexural strength and modulus, as well as the impact strength, of the compound could be tailored to fit the design requirements in the plastic sheet as necessitated by the final product performance.

Another aspect of the invention is a process for producing thermoplastic sheets of filled polyolefin with or without additional reinforcement which are low in cost and which have excellent performance properties. Different types of reinforcements known to those skilled in the art such as nonwoven fiber glass mat, fiber glass cloth, metal strands, metal mesh, wire cloth, or continuous metal foil or sheet metal, etc., may be used.

The resulting assembly will be a thermoplastic polymer-impregnated fillers with metal or glass reinforcement for structural applications. The assembled sheet product exhibits edgewise compressive strength, shear strength, and modulus, as well as other properties that are improved over the properties of the polymer alone and at a lower cost.

BRIEF DESCRIPTION OF THE DRAWING

FIG. 2 is a partial schematic showing a modified system for lamination similar to FIG. 1, except that the reinforcing sheets are wholly embedded in the polymeric composition.

FIG. 3 is a partial schematic showing another modification of the system of FIG. 1, wherein the formed thermoplastic sheet is divided lengthwise to form the outer laminates with a reinforcing sheet sandwiched between the two.

FIG. 4 represents in cross section a sheet formed in accordance with the system of FIG. 1.

FIG. 5 represents in cross section a laminated sheet produced by the system depicted by FIG. 2.

FIG. 6 represents in cross section a laminate of the kind produced by the system of FIG. 3.

FIG. 7 illustrates in cross section still another laminate which comprises three reinforcement laminates embedded in the thermoplastic.

DESCRIPTION OF THE PREFERRED EMBODIMENTS

Figure 1:
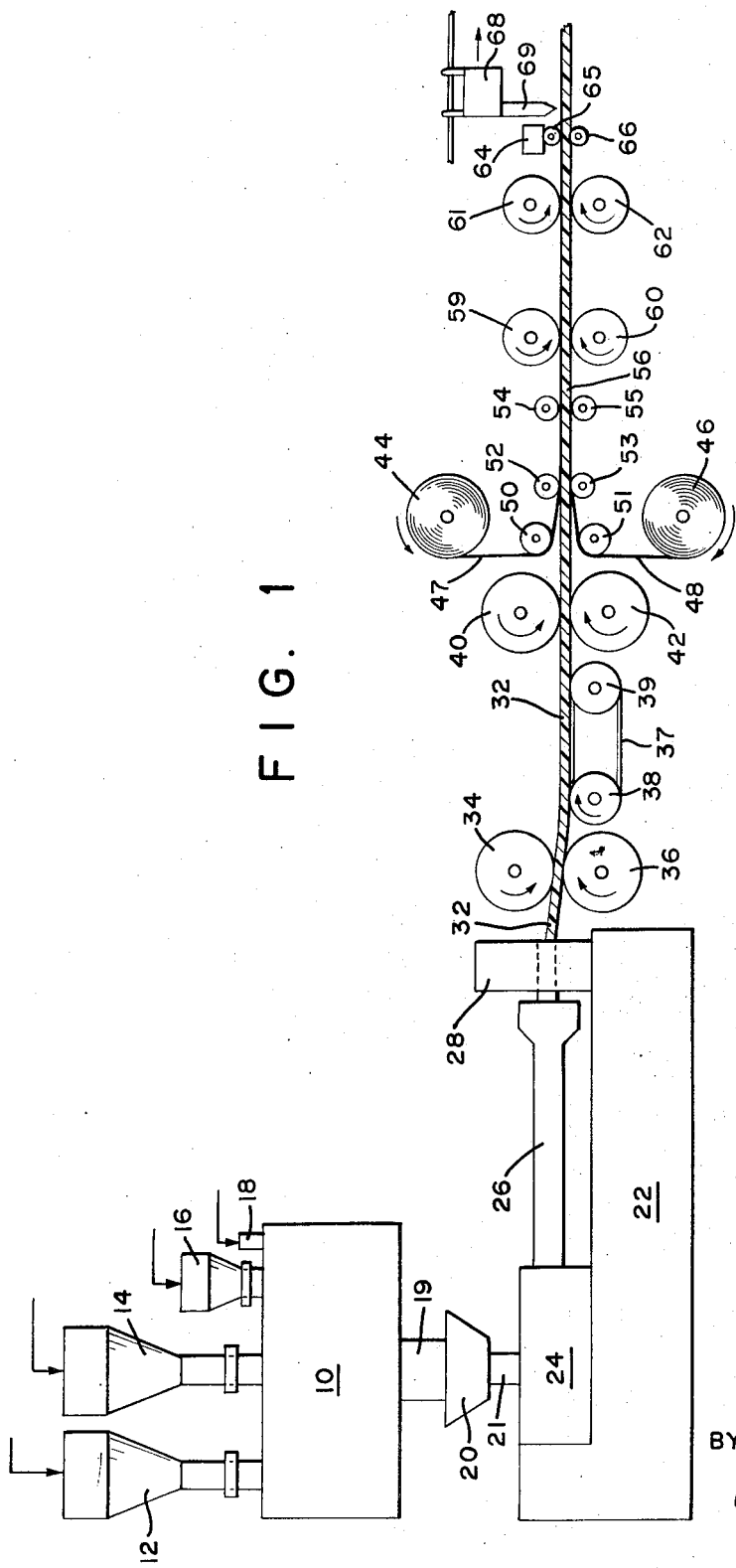
FIG. 1 depicts a schematic layout of an automatic and continuous sheeting system to fabricate reinforced, filled thermoplastic polymeric sheets according to the invention.

The thermoplastic compositions are described with polyethylene as the typical, high molecular weight polyolefin and polyisobutylene as the typical elastomer to facilitate the description, and it will be apparent that the invention is not to be construed as limited to these specific polymers.

The thermoplastic-shapable sheets of the present invention which are capable of being formed by use of conventional metal-forming apparatus employ a polyolefin, i.e., polyethylene or polypropylene, of high or extra-high molecular weight, i.e., an average molecular weight of the order of at least 400,000 and preferably molecular weight average of 1.5 million, intermediate density (0.945 g./cc. or higher density up to 0.95 g./cc.) linear polyolefin. This resin system into which a minor amount of an elastomer such as polyisobutylene is blended possesses exceptional toughness, excellent low temperature impact strength, and high resistance to crack initiation and propagation. It also offers excellent resistance to chemicals and high abrasive resistance.

The formable, filled-polymer composition retains a measurable portion of its strength and stiffness up to the crystalline melting point at 275° F. The polymer, whose molecular weight average is 1.5 million, has an extremely high melt viscosity and very low critical shear rate (critical shear rate about 8 sec.$^{-1}$ with corresponding apparent viscosity of 550,000 poises at 572° F.).

The high molecular weight of this unfilled polymer presents substantial processing difficulties if attempts are made to employ ordinary thermoplastic techniques.

The present invention utilizes a nonpolymeric silica filler of high degree of purity, nonporous and with closely controlled, uniform micron-size particles. The size of the particles preferably varies from about one micron up to about 40 microns. The proportions of particles may be varied generally within this range. The chemical composition of the silica used is essentially as follows.

| Composition: | Percent |
|---|---|
| $SiO_2$ | 99.9 |
| $Fe_2O_3$ | 0.023 |
| $Al_2O_3$ | 0.09 |
| $TiO_3$ | 0.009 |
| CaO | Trace |
| MgO | Trace |

This particular silica filler is characterized by having hard particles with high modulus. It is easily wetted and disperses readily in the polyethylene polymer. Each particle is granular in shape with a length-to-diameter ratio less than 5 to 1. The particles are capable of existing and remaining in a discontinuous phase when impregnated by the polyolefin polymer. The silica particles have a very low coefficient of thermal expansion ($3.66 \times 10^{-6}$/in. F.) and moderate thermal conductivity (0.017 B.t.u./ft.$^2$sec./F./in.). Silica of this kind is readily available and obtainable in a refined condition from Pennsylvania Glass Sand Corporation as "Min-U-Sil," for example. The resulting composite will have a relatively lower coefficient of thermal expansion than that of the unfilled system and is proportional to the volume of the used filler.

The impregnation of the filler is accomplished by subjecting the molten polymer with the filler to high shearing forces, thereby intimately dispersing the filler in the polymeric matrix and forming a uniform composite. A good interfacial bond between the silica particles and the polymer is achieved resulting in a composite with improved mechanical properties. A major proportion by weight of the silica filler, i.e., amounts of more than 50% and as high as 68% by weight and even higher, may be used to produce a composite with mechanical properties substantially improved over those of the polymer alone.

I have found that the silica filler functions in at least the following capacities: (1) to improve the strength and modulus of the composite, especially in flexure, at a reduced cost; and (2) to simplify the processing of the compound using conventional thermoplastic equipment. The optimum filler concentration in this type of a composite is controlled by the silica particle size, particle shape, and particle size distribution. Silica particles which pass a 325 mesh with residues less than 0.5% is considered as the preferable maximum size for use in the composite sheets of the invention. There is no precise limit on the lower size particles. Particles as small as 0.5 micron, or small particles in the range of 100 to 200 millimicron, can be successfully used. The following particle size distributions have been used.

MIXTURE NO. 1

This is a commercially available coarse silica, 325 mesh, with the following particle size distribution:

| | Percent |
|---|---|
| $40\mu$ or less | 98.5 |
| $30\mu$ or less | 85.0 |
| $20\mu$ or less | 65.0 |
| $15\mu$ or less | 54.0 |
| $10\mu$ or less | 40.0 |
| $5\mu$ or less | 20.0 |
| $2\mu$ or less | 9.0 |
| $1\mu$ or less | 7.0 |

MIXTURE NO. 2

This is of uniform and controlled size silica, 30 micron grade, with the following particle size distribution:

| | Percent |
|---|---|
| $30\mu$ or less | 98.7 |
| $25\mu$ or less | 95.5 |
| $20\mu$ or less | 90.0 |
| $15\mu$ or less | 77.0 |
| $10\mu$ or less | 55.0 |
| $5\mu$ or less | 28.0 |

MIXTURE NO. 3

This is 15-micron grade silica, with the following particle size distribution:

| | Percent |
|---|---|
| $15\mu$ or less | 98.7 |
| $10\mu$ or less | 90.0 |
| $7\mu$ or less | 75.0 |
| $5\mu$ or less | 57.0 |
| $3\mu$ or less | 32.0 |

MIXTURE NO. 4

Ten-micron grade silica, with the following particle size distribution:

| | Percent |
|---|---|
| $10\mu$ or less | 98.7 |
| $7\mu$ or less | 91.0 |
| $5\mu$ or less | 75.0 |
| $3\mu$ or less | 48.0 |

MIXTURE NO. 5

Very fine mixture (5-micron grade silica) with the following particle size distribution:

| | Percent |
|---|---|
| $5\mu$ or less | 98.7 |
| $4\mu$ or less | 97.0 |
| $3\mu$ or less | 87.0 |
| $2\mu$ or less | 70.0 |
| $1\mu$ or less | 50.0 |

The foregoing mixtures of different particle size distribution are given for illustration purpose and should not be construed as limiting. Narrower and wider ranges of particle sizes and distribution may also be used. The particle sizes and distributions shown in mixtures 1 through 5 permit the forming of polyolefin-filled composites containing on the order of 70% by weight of the reinforcing silica filler with improved mechanical properties. The proper combination of silica particle size and size distribution also improves the processing of the thermoplastic sheets and significantly increases the melt or flow index of the filled material. No special surface treatment of the silica particles is necessary since a good bond between the matrix material and the reinforcing particles is readily achieved. However, it is preferable that the particular silica be substantially dried to free it from any surface moisture.

In compounding the thermoplastic, formable sheets of the invention, I have found that a substantial additional improvement in the impact and toughness properties results in the performance characteristics of the composite by incorporating therein a small amount of an elastomer, e.g., polyisobutylene. An especially suitable polyisobutylene polymer for this purpose is a highly paraffinic hydrocarbon polymer of medium molecular weight (viscosity average molecular weight of about 100,000) and density of 0.92 g./cc. Other elastomers which may be used in lieu of polyisobutylene polymers or copolymers, or in admixture therewith, are compounds known in the art to possess similar characteristics and of comparable molecular weights, including polybutadiene and other hydrocarbon oils or natural or synthetic rubber resins.

The strength of the compound is significantly enhanced by the addition of a small amount of the polyisobutylene polymer (e.g., 1 to 5% by weight). Although larger amounts of this polymer may be employed, from a practical (i.e., cost) standpoint, the minimum quantity which is effective is preferred. The impact strength, as well as the basic mechanical properties of the composite can be adjusted by varying the percentage of the polyisobutylene polymer and the silica filler. It will be understood that, for every compound of a filled ratio of silica to polyethylene, an optimum percentage of polyisobutylene polymer can be added to achieve maximum impact strength without degrading the basic mechanical properties of the composite in terms of strength and stiffness. The improvement in the impact strength is mainly accomplished by improving the energy absorption characteristics of the composite.

Although the silica-filled, polyethylene-polyisobutylene blend of the invention may be employed satisfactorily in many applications without additional reinforcement, it is preferred in many uses to incorporate a reinforcing material. Different types of reinforcements such as fiber glass mat, woven fiber glass cloth, meshed steel cloth or thin steel plates or foil of specified gauge can be used.

In connection with the reinforcing web, surface treatment of the web may be necessary. For example, in the case of steel foil reinforcement, surface degreasing and surface oxidation of the steel will be necessary to achieve maximum bonding between the thermoplastic composite and the reinforcing sheets. If the reinforcement is in the form of mesh or wire cloth, then the molten composite will penetrate between and around the steel wires. The penetration of molten material through interstices will result in a combination of a chemical bond between the individual steel wires and the composite accompanied by a mechanical bond due to the interlocking of the mesh wires among the surrounding composite thus forming a completely integrated, reinforced composite. Mesh steel wires of different mesh size and wire diameter are chosen to provide the desired strength and stiffness from the reinforced thermoplastic sheet. In the case of steel foil reinforcement, oxidation of the flat and continuous surface of the steel plates will enhance the bond strength between the composite and the steel sheets. In the case of fiber glass mat or cloth, the glass fibers may be coated with a surface finish, e.g., polyisobutylene surface coating, which is compatible with the polyethylene composite; this would then enhance bonding between the two. The elevated temperature of the molten thermoplastic during processing, as well as the pressure exerted by the laminating apparatus, will result in an integrated reinforced composite system.

The invention will be further described by reference to the accompanying drawings and the examples that follow. The details therein are provided for illustrative purposes primarily and are not to be construed as limiting the instant invention, which is defined by the appended claims.

The production of this type of thermoplastic sheets may readily be accomplished batchwise or by a continuous processing line with controlled process parameters. The following continuous production line, as described in conjunction with the figures of the drawings, is typical and proceeds with a minimum of manual and supervisory manpower.

In the first step, a dry blender is used to mix large batches of the filler, the polyolefin, and the elastomeric polymer, e.g., polyisobutylene. The mixer is fed directly from automatic valves placed on the storage hoppers.

The desired silica filler (chosen particle sizes, particle size distribution and particle shapes) and the basic polymers are fed into the compounding mixer to dry and disperse the filler throughout the solid polymers. In this step, a readily available feedstock with a reliable degree of mixture uniformity will be produced.

The size of each batch depends upon the desired rate of producing the final thermoplastic sheets. Batches of up to 300 cu. ft. (equivalent to about 30,000 lbs. of the compound) can be mixed. During this step, the temperature of the compound can be elevated to 100°–110° C. Also, vacuum dispersion and drying can be easily utilized to minimize the mixing time in the next processing step.

In the second step, the dry compound is introduced to a continuous mixer for melt blending the thermoplastic polymers with the reinforcing fillers. The feedstock is automatically fed to the rotor sections of the continuous mixer where it will be propelled to the mixing section of the machine. Intensive mixing of the thermoplastic compound is achieved by incorporating intensive shearing forces on the compound between the rotor and the mixing chamber walls. This will result in kneading the compound between the rotors which is accompanied by a rolling action of the material itself. The mixed and molten compound can be discharged either through an orifice opening of an extruder attached to the end of the mixer or directly from the mixer. The temperature of the discharged thermoplastic material (between 375°–400° F.) is controlled by the rotor speed in the mixer. Production rates are controlled by the rotor speed and the size of the discharge orifice opening on the extruder.

The mixed stock material is fed to a roller mill with differential speed rollers for a preliminary sheeting operation. The rollers are heated up to 375° F. to maintain the high temperature of the stock material while introducing the mill-shearing action to ensure complete impregnation of the filler by the polymers with complete and uniform dispersion throughout the sheet area. The width of the thermoplastic sheet can be adjusted up to 96".

The roughly milled sheet is fed to the final sheeting mill by a conveyor belt for finishing the sheet and reducing its thickness to the desired gauge and tolerance. A second set of milling rollers comprise uniform speed rollers which are heated to the desired temperature between 350°–375° F. to control the gauge and tolerance of the thermoplastic sheet. The reinforcing sheets (in the form of steel mesh wire mat, steel plates with thin gauge, glass cloth or glass mat) are fed directly from a drum driven by an axle with controlled speed. The feed-in speed of the reinforcing sheets is directly controlled by the rate of production of the thermoplastic-filled polyethylene sheet in terms of lineal feet per unit of time for a specified sheet width. The width of the finished sheet can be increased up to 96" and the finished sheet can be of any desired length. The width of the reinforcing sheets should be about 2" less than the width of the thermoplastic sheet.

The reinforcing sheets are guided by a system of drums and forwarded to laminating rollers to be bonded to the molten thermoplastic sheet under pressure. The overall sheet passes through a system of take-off and cooling drums to be cooled under pressure. The finished sheet is cut to the desired size by an automatic slitter and stacked for storage.

In certain types of applications, the reinforcement may be applied from one side of the sheet only. This is accomplished by a feed-in from a single reinforcement drum. In other applications, no reinforcement may be necessary and the filled thermoplastic sheet can be used independently.

Referring to FIG. 1, the continuous fabrication of thermoplastic sheet is illustrated. Previously dried silica from hopper 12 is fed to mixing chamber 10, together with extra-high molecular weight polyethylene, either in powder or particle form, from hopper 14 and polyisobutylene polymer, in particle form, from hopper 16. Additionally, any scrap material resulting from trimming, edging, slitting, etc., may be reground and recycled to mixer 10 as shown at 18. After the mixture is thoroughly blended, it is fed through the controlled, timed, enclosed feeding passage 19 to hopper 20 where it is stored and fed at a controlled rate to continuous mixer unit 24 through chute 21. The continuous mixer 24 feeds directly into either extruder 26 or the preliminary sheeting mills 34 and 36. The rate of feed of mixer-extruder 24, 26, is controlled by the desired rate of production of the thermoplastic sheet 32 in terms of sheet thickness, width and length per unit of time. As stated hereinabove, after the blend has been thoroughly mixed, it can either be extruded and fed through the adjustable orifice or die 28, which controls the rate of output, or fed directly to rollers 34, 36. The sheet 32 passes between heated mill rollers 34 and 36, which have a differential speed and form the preliminary thermoplastic sheet. Thereafter, sheet 32 is suitably supported on driven belt conveyor 37 which is carried on driving roller 38 and idler roller 39. The sheet is then passed between heated rollers 40 and 42, which provide the desired thickness and width to the sheet. At this juncture the sheet may be used to make shaped articles directly or it may be trimmed and slit to the desired dimensions such as by a trimmer shown at 68 and 69 and then sent to forming operations, or the sheets may be packaged for shipping.

The sheet may be provided with additional reinforcement material 44 and 46 as shown in FIG. 1. The reinforcement may comprise one or more layers or inserts of metal or other material such as fiber glass either woven or unwoven. The metal may be in the form of mesh, strips of wire, foil, etc. The reinforcing material from supply rollers 44 and 46 is guided by rollers 50 and 51 and laminated to the thermoplastic sheet aided by heated squeeze rollers 52, 53, 54 and 55 which, by use of appropriate pressure, control the dimensions of the laminated sheet 56. Paired rollers 59–60 and 61–62 are take-off and cooling drums whereby the final sheet is retained under pressure to ensure a suitable finish and preclude distortion or warping. A quality control mechanism which detects surface characteristics and thickness of the sheet within allowable tolerances is shown at 64, 65 and 66, respectively. A movable cutter arrangement 68 and 69, which may be arranged to travel with the moving sheet, cuts the sheet to final desired size. The product derived at this point may be transported to a forming operation wherein the shaping apparatus is maintained at ambient temperature prior to cooling, or allowed to cool, and packaged for shipment. Scrap material derived from trimming, etc., may be automatically recycled by a conventional conveyor mechanism (not shown) to scrap regrinder 18.

Illustrated in FIG. 4 is the laminated thermoplastic sheet formed by the apparatus of FIG. 1 comprising a thermoplastic core 32 sandwiched between reinforcing sheets 47 and 48.

It is to be noted that this process, while applicable to the filled composition of the present invention, is not applicable to the extra-high molecular weight polyethylene per se, i.e., without the filler, which is employed in composition employed by applicant. This is mainly attributable to the substantial improvement in flow characteristics of the filled system as compared to the unfilled polymer.

The embodiment illustrated in FIG. 2 varies from that of FIG. 1 in that the reinforcement applied to the sheet of FIG. 1 is coated or embedded in the thermoplastic sheet. As shown, sheet 32' is liminated with reinforcing sheets 47' and 48' fed from rolls 44' and 46' by pressing between guide rollers 50' and 51'. This laminated sheet is then coated with an upper thermoplastic sheet 72 fed between mill rollers 75 and 76 and a lower thermoplastic sheet 73 which is fed between mill rollers 77 and 78. These layers, which may be the same polymer composition as core 32' or a different thermoplastic such as polyvinyl chloride, nylon, polyester, nylon-polyester or a polyethylene of the same type with a lower silica-filler content, are then compressed to laminate them between paired pressure squeeze rollers 52' and 53' and 54' and 55' to produce laminate sheet 80, which may be thereafter continued in the processing shown in FIG. 1 beginning with the pair takeoff and cooling drums 59 and 60 and 61 and 62. It will be noted that in the system of FIG. 2 the rollers 75 and 76 and 77 and 78 may be adjusted to generate any desired thickness of a film thickness of a few mils, which is essentially a coating, to a laminate thickness of 25–100 mils or more. These thicknesses will be dictated by the structural requirements of the fabricated laminated sheet.

Illustrated in FIG. 5 is the laminated thermoplastic reinforced sheet in which the reinforcing layers 47' and 48' are completely embedded in between core 32' and thermoplastic sheets 72 and 73. The composite of FIG. 5 has the structural features of that of FIG. 4. Additionally, it has the advantages of greater resistance to water absorption and of other adverse changes brought about by weathering or usage and offers a smoother and cleaner and more readily cleanable surface.

The embodiment illustrated in FIG. 3 is modified in that the filled sheet of FIG. 1 prior to addition of the reinforcement is slit and the slit halves are superimposed and employed to sandwich between the slit halves a reinforcing layer. As shown, the filled sheet 32 from the adjustable orifice 28 of FIG. 1 is split into two halves: 32a which is conveyed between rollers 84 and 85 and 32b which is conveyed between rollers 86 and 87. The two sheets are then guided under the squeeze rollers 89 and 90 and 91 and 92, respectively, while sandwiching between them reinforcing material 83 fed from feed drum 82 to produce laminate sandwich 93, shown in more detail in FIG. 6. This laminate offers the advantages of the laminate of FIG. 5, except in terms of the structural performance.

It will be apparent to those skilled in the art, based upon the teaching herein, that a variety of other laminated composites may be prepared by other combinations of various assemblied described in FIG. 1 through FIG. 3; the latter are provided primarily as illustrative of the invention and not as a limitation. For example, FIG. 7 illustrates another laminate which has three reinforcing layers 94, 95 and 96 embedded within thermoplastic layers 97, 98, 99 and 100, which may be the same or different thermoplastic sheets of thicknesses dictated by the structural requirements. Reinforcing layers 94, 95 and 96 may be the same or a combination of different materials, or different thicknesses or physical forms of the same materials. For example, steel foil may be used in combination with a steel mesh or fiber glass cloth or both. Alternately, a fiber glass mat may be used in combination with a woven fiber glass cloth or metal foil, etc.

In the examples that follow, several types of composites employing high molecular weight polyolefins are described to demonstrate the improvement in the mechanical properties of this type of thermoplastic sheets. The effect of the ratio between the different components of the composite, the effect of silica particle size and distribution, as well as the effect of the steel reinforcement on the properties of the composite, is demonstrated. Parts expressed are parts by weight unless otherwise stated. Experimental results for the mechanical properties of all composites in Examples 1–18 are summarized in Table II which follows the examples.

EXAMPLE 1

This, the control sample, is fabricated from AC–1222 Polyethylene, extra-high molecular weight 1.5 million, medium density 0.945 g./cc. polymer, available from Allied Chemical Corporation. Sheets of 0.125" thickness were molded into picture frames and specimens were cut for testing.

Tests in this example, as well as in all the following examples, were conducted according to the following ASTM test standards: specific gravity, D792–66; tensile properties; D638–68; flexural properties, D790–66; and impact resistance, D256–56.

Tensile, flexural and impact strength data were developed for all the samples to indicate their relative strength index.

It is to be noted, however, that all the tensile tests were conducted at a machine head-speed of 0.2 in./min. The machine head-speed is a very significant parameter in developing the tensile yield strength, especially if the material is strain-rate sensitive as in the case of polyolefin polymers.

EXAMPLE 2

A batch of 500 grams of silica with $5\mu$ particle size, with particle size distribution as in mixture No. 5 hereinabove described, was dried in a circulated-air oven and then cooled to 100° C. Another batch of 500 grams of extra-high molecular weight polyethylene having an average molecular weight of 1.5 million was added to the silica and the mixture was tumbled together to ensure a uniform dry mix. The mixture was milled on steam-heated roller mill at 375° F. roller temperature. Polymer fusing occurs after a few minutes and the compound was milled for 2 more minutes after fusing to ensure complete filler wetting. The milled sheet was placed in a picture frame 0.125" thick and press-molded to form a sheet 10" x 10". Standard specimens were cut and tested as in Example 1. In this example, no polyisobutylene polymer was added and the compound contained 50% by weight silica and 50% by weight polyethylene.

EXAMPLE 3

The same type of silica particle size and particle size distribution as in Example 2 was used; also, the same processing technique was followed. However, in this example the percentage of silica filler was increased to 68% by weight and the percentage of the polyethylene resin was reduced to 32% by weight. No polyisobutylene polymer was used. Test samples were obtained following the same procedures as in Example 1.

EXAMPLES 4–8

In these examples, different amounts of polyisobutylene polymer were introduced to modify the impact characteristics of the filled compound.

EXAMPLE 4

The compound consisted of 68% by weight silica of the same size particles as in Examples 2 and 3, and 32% by weight polyethylene polymer. One percent of the total weight of the composite was a polyisobutylene polymer characterized by having an average molecular weight of 100,000 and density of 0.92 g./cc. The polyisobutylene polymer was in a chunk form and was added during the dry mixing of the silica and the polymer. The same milling procedure and press-molding of sheets, as used in Examples 2 and 3, were used. The structural index of the finished sheets in terms of tensile, flexural and impact properties was measured.

EXAMPLE 5

The same basic compound as in Example 3 with the addition of a higher percentage of the same polyisobutylene polymer as in Example 4 is used. This sheet contained polyisobutylene polymer at 2% by weight of the basic compound. The same basic mechanical properties of the sheet were determined as in previous examples.

EXAMPLE 6

This sheet contained 3% by weight of polyisobutylene polymer and the same polyethylene-silica compound as in Example 3.

EXAMPLE 7

This sheet contained 4% by weight of polyisobutylene polymer and the same polyethylene-silica compound as in Example 4.

EXAMPLE 8

This sheet contained 5% by weight of polyisobutylene polymer and the same polyethylene-silica compound as in Example 3.

EXAMPLE 9

In this sheet the fabrication procedures for making the sheets was altered as compared to the process used in Examples 1 through 8. A Banbury mixer was used to initiate the mixing and increase the wetting of the fillers. The silica was dried and mixed with the polyethylene polymer and the polyisobutylene polymer as before. The dry mixture, however, was placed in a Banbury mixer for two minutes for thorough mix. The molten compound was then transferred to a mill with a differential-speed rollers to form the initial sheets. The milled sheets were press-molded in a picture frame and test samples were obtained as in the previous examples. The compound in this example contained the same weight ratios as that in Example 4. The example is cited mainly to demonstrate the effect of the processing on the mechanical characteristics of the composite.

EXAMPLES 10–14

The main purposes of these examples is to demonstrate the effect of the particle size and particle size distribution of the silica filler on the mechanical properties of the resulting composite.

EXAMPLE 10

All the silica fillers used were of a uniform and controlled particle size as in mixture No. 4 hereinabove described. The same weight ratio of ingredients as in Examples 4 through 9 was used, i.e., 68% by weight $SiO_2$, 32% by weight polyethylene, and 1% by weight of the total compound of polyisobutylene polymer. The same processing procedure as in Example 9 was used, i.e., a Banbury and roller mill for mixing and milling and then press-molding for the final test specimens. The mechanical properties of the composite were measured according to standard ASTM test methods noted hereinabove.

EXAMPLE 11

The same composition as Example 10 is employed, except for the size of the silica particles. All the silica particles used in this example were of particle size distribution as shown in mixture No. 3 described above.

EXAMPLE 12

Here, a coarser grade of silica particles was used. All the particles were of uniform and controlled size, with particle size distribution as shown in mixture No. 2 described above. Again, the same percentages of filler, polyethylene and polyisobutylene were used as in Examples 10 and 11 and the same type of mechanical tests were conducted.

EXAMPLE 13

In this example a combination of different fine and coarse silica mixtures was used to reinforce the polyethylene. The silica particle size within one range (e.g., 5μ size) was uniform and controlled. The weight ratio between the fine and coarse silica follows:

| Silica size | Mixture Number | Weight percent filler |
|---|---|---|
| 30μ | 2 | 40 |
| 15μ | 3 | 30 |
| 10μ | 4 | 20 |
| 5μ | 5 | 10 |

Again, the percentage by weight of filler, polyethylene and polyisobutylene is the same as in Examples 10–12. Also, the same processing technique and mechanical testing as in previous examples were employed.

EXAMPLE 14

In this example, a higher percentage of the coarse silica particle size was used to form the composite. The weight ratio between the coarse and fine silica used is as follows:

| Silica size | Mixture Number | Weight percent filler |
|---|---|---|
| 30μ | 2 | 70 |
| 15μ | 3 | 15 |
| 10μ | 4 | 10 |
| 5μ | 5 | 5 |

The weight percentage between the silica, polyethylene and polyisobutylene is the same as in Example 13.

EXAMPLE 15

A commercially available coarse silica was used with particle size distribution as shown in mixture No. 1. Again, a 68% by weight silica and 32% by weight polyethylene with polyisobutylene polymer at 1% by weight of the compound was used. The same processing and types of tests as adopted in previous examples were used.

EXAMPLE 16

In this example the silica particles were used as received with out predrying and mixed with the polyethylene. This compound is similar to that in Example 4 in terms of particle size and distribution, as well as the weight percentage of the filler and polymers. The main purpose of this example is to evaluate the effect of the residual moisture on the silica surface on the interfacial bonding between the silica and the polyethylene as reflected in the mechanical properties of the composite.

EXAMPLES 17–18

In these examples, steel reinforcement in the form of steel wire mesh of different mesh size and wire diameter was used to demonstrate the effect of steel reinforcement on the strength and stiffness of the filled polyethylene compounds. In both examples, the same silica type and the weight percentage of the filler and polymers as in Example 4 were used. The filled polyethylene sheets were formed by a Banbury and roller mill combination as in Example 9. The resulting sheets were used to form the steel sandwiched plates in pictures frames of 0.125" thickness. Low pressure was used to form the sandwich and to avoid any rupture in the mesh steel wires. Again, the same type of mechanical testing was conducted on the steel reinforced-filled polyethylene sandwich. In both examples, however, only one steel mesh wire laminate was used and placed in the center of the sandwich. The effect of reinforcement to the flexural strength or stiffness of the sandwich will be minor due to the geometrical location of the reinforcement. Other types of reinforcements such as two steel wire mesh plates, where one plate can be located on the top and on the bottom faces of the sandwich, can be used for effective tensile and flexural strength and stiffness characteristics. Also, continuous steel plates or fiber glass mats, individually or in combination of one or more layers, can be easily incorporated into the sandwich structure to provide the desired strength, stiffness and impact characteristics as required by the structural design.

EXAMPLE 17

In this example, one steel wire mesh sheet (mesh size 18 x 16, i.e., 18 wires longitudinal and 16 wires transverse per square inch) was used. The wire diameter was 0.011". The thermoplastic compound used was the same as that in Example 4. The weight of the steel wires was 11.75%, whereas the weight of the thermoplastic compounds used was 88.25% of the total sheet.

EXAMPLE 18

A different type of meshed steel wire sheet was used in this example. Mesh size 10 x 10 (i.e., 10 wires longitudinal and 10 wires transverse per square inch) reinforced the thermoplastic sandwich. The thermoplastic compound used in this sandwich was the same as that in Example 4. The weight of the steel wires was 7%, whereas the weight of the thermoplastic compound was 93% of the total weight of the sandwiched sheet.

Based on the data shown in Table II, it is seen that, by use of the specified silica as filler in the extra-high molecular weight polyethylene and a very small percent of the polyisobutylene polymer as plasticizer, all the basic mechanical properties of the composite can be significantly improved. For example, the tensile yield strength of the composite can be increased to at least 50% higher than the yield strength of the polyethylene material alone. Also, the composite possesses improved tensile modulus which is at least three times that of the unfilled system.

While the tensile yield and ultimate elongation of the filled system has been decreased as compared to that of the polymer alone, because of the presence of the very substantial proportions of filler in the composite, the ductility of the composite nevertheless remains quite adequate for structural applications.

A significant improvement is reflected in the flexural properties of the composite. For example, as shown in Table II, the flexural strength of the composite is at least twice that of the unfilled polymer. Also, the flexural modulus is at least four times that of the unfilled system.

These mechanical properties are maximum at a filler concentration of 68% by weight, 32% by weight polyethylene and 1% of the total compound of polyisobutylene polymer. The use of the polyisobutylene polymer at 1% by weight improves the impact resistance of the compound without jeopardizing the basic strength and stiffness of the composite product. This is shown by Examples 4, 5, 6, 7 and 8.

To further demonstrate the improvement in the characteristics of the new composite, a sample was formed from 68% of weight silica and 32% by weight polyethylene with 2.5% by weight (of the silica-polyethylene) polyisobutylene polymer. The silica, filler and polyethylene and polyisobutylene polymers were the same as that used in Examples 4 through 9. The processing of the thermoplastic sheet was identical to that in Example 9. Samples for the impact resistance of the composite by the free-falling Dart method (ASTM standard D1709–67) were fabricated and tested. All the tested specimens passed the 12.5 ft.-lb. impact level without any failure. The median impact resistance of all tested samples was 14 ft.-lb. The tested specimens, however, did not shatter at this energy level, and a mere dent at the point of impact remained on the surface of the samples. Very few specimens showed an indication of a small crack at the impact point.

Samples from the above composite thermoplastic sheet were also fabricated for fatigue and creep testing according to ASTM standard test methods D671–D, repeated flexural stress of plastics, and D674, testing for long-time creep of plastics under tension.

The fatigue specimens were tested at room temperature and subjected to a stress level of 2070 lb./sq. in., which is equivalent to 50% of the ultimate tensile strength of this particular composition. The tested specimens survived to 10 million cycles and the tests were discontinued thereafter.

The creep specimens were tested under a constant tensile load which introduced a stress level in the test samples equivalent to 2070 lb./sq. in. The creep specimens were tested under room conditions according to ASTM standards shown before. All test specimens survived up to 13,000 hours without failure or excessive elongation (less than 10% total elongation). The unfilled polyethylene AC-1222, however, will survive less than 50 hours at a stress level of 1200 lb./sq. in. with very excessive elongation (greater than 25% total elongation).

Another significant improvement in the characteristics of the new composite is in the flow rate of the filled system as compared to the unfilled extra-high molecular weight polyethylene alone. Using ASTM standard test method D1238 for measuring the flow rate of the material, conditions F were selected (temperature 190° C., weight=21,600 grams). Test samples from Example 1 hereinabove were utilized and the measured flow rate was 0.07 gram/10 minutes. Test samples from Example 9, hereinabove, were used to measure the flow rate of the filled composite resulting in a meaturement of 0.23 gram/10 minutes. This increase in the flow rate of the filled system is advantageous in the processing of the composite on the equipment shown in FIG. 1.

An additional advantage in the new composite is in its behavior at sub-zero temperature environment, as well as its residual properties at elevated temperature (up to 175° F.). To demonstrate this advantage, samples for Examples 2 and 3 as mentioned above were tested at sub-zero temperature, at room temperature, and at elevated temperature. ASTM standard test methods D636–68 and D790–66 were utilized and the test results are summarized in Table I.

TABLE I

Mechanical properties of filled polyethylene composite at various temperatures]

| Properties | Example 2 | | Example 3 | | |
|---|---|---|---|---|---|
| | 72° F. | 176° F. | −40° F. | 72° F. | 176° F. |
| Flexural strength (p.s.i.) | 4,850 | 860 | 13,060 | 6,810 | 2,230 |
| Flexural modulus ×10⁻⁶ (p.s.i.) | 0.254 | 0.048 | 1.05 | 0.528 | 0.114 |
| Tensile strength (p.s.i.) | 3,570 | 1,460 | 7,700 | 4,360 | 1,780 |
| Tensile modulus ×10⁻⁶ (p.s.i.) | 0.266 | 0.058 | 1.08 | 0.544 | 0.123 |

What is claimed is:

1. A method of preparing a thermoplastic sheet capable of being shaped at ambient temperature which comprises intimately blending (a) from about 30 to about 50 percent by weight of a polyolefin having an average molecular weight of at least 400,000 and a density of at least 0.945 g./cc. and (b) from about 70 to about 30 weight percent of silica having a particle size of 40 microns or less, which has been dried so that it contains no more than about one percent moisture under heat until a uniformly homogeneous dispersion is obtained, applying said dispersion on a casting surface and densifying and cooling said cast dispersion to provide a thermoplastic sheet which may be formed into shaped articles.

2. The method of claim 1, wherein (a) is a polyethylene having an average molecular weight about 0.4 million or more.

3. The method of claim 1, wherein from about 1.0 to about 5.0 weight percent of (c) an elastomer is blended into the uniform dispersion before casting.

4. The method of claim 3, wherein the elastomer (c) is polyisobutylene.

5. The method of claim 1, wherein said dispersion after casting is bonded to a reinforcing laminate.

6. The method of claim 5, wherein the reinforcing laminate comprises a fiber glass mat.

7. The method of claim 5, wherein the reinforcing laminate comprises a woven fabric.

8. The method of claim 5, wherein the reinforcing laminate comprises a metal foil.

9. The method of claim 5, wherein the reinforcing laminate comprises a metal mesh.

10. A method for forming a thermoplastic sheet from which articles may be shaped in a stamping apparatus maintainable at ambient temperature, said process comprising intimately blending silica which is substantially free of moisture and polyethylene having an average molecular weight of at least 400,000 under heat and pressure until a uniform dispersion is attained, casting said dispersion on a sheet-forming surface, applying pressure to said dispersion to produce a sheet of substantial uniform cross section.

11. The method of claim 10, wherein the formed sheet is transferred to a shaping apparatus maintained at ambient temperature and is formed into a shaped article.

12. A continuous process for the production of a thermoplastic resinous sheet comprising intimately blend-

TABLE II

| | Composition (percent by wt.) | | | | Properties | | | | | | | | | |
|---|---|---|---|---|---|---|---|---|---|---|---|---|---|---|
| | | | | | | Tensile ᵃ | | | | | Flexural ᵇ | | Impact | |
| Ex. No. | SiO₂ | Extra-high mol. wt. polyethylene | Poly-butylene | Steel wire mesh | Density (g./cc.) | YS (p.s.i.) | YE (percent) | US (p.s.i.) | UE (percent) | Modulus ×10⁻⁶ (p.s.i.) | FS (p.s.i.) | FM ×10⁻⁶ (p.s.i.) | Broad face (ft. lb.) | Izod (ft. lb./in notch) |
| 1 | 0 | 100.0 | 0 | | 0.945 | 2,460 | 13.8 | 3,930 | 520.0 | 0.108 | 2,870 | 0.095 | 22.0 | 20.00 |
| 2 | 50.0 | 50.0 | 0 | | 1.40 | 3,500 | 2.7 | 3,570 | 7.1 | 0.266 | 4,850 | 0.254 | | |
| 3 | 68.0 | 32.0 | 0 | | 1.66 | 4,200 | 2.6 | 4,360 | 6.9 | 0.544 | 6,810 | 0.528 | ᶜ 5.5 | 2.6 |
| 4 | 67.4 | 31.7 | 0.9 | | 1.659 | | | | | | 7,260 | 0.467 | 10.0 | 6.5 |
| 5 | 66.65 | 31.4 | 1.95 | | 1.634 | | | | | | 6,480 | 0.422 | 7.2 | 4.7 |
| 6 | 66.1 | 31.0 | 2.9 | | 1.620 | | | | | | 6,340 | 0.417 | 6.6 | 4.5 |
| 7 | 65.4 | 30.75 | 3.85 | | 1.608 | | | | | | 6,480 | 0.447 | 8.3 | 5.3 |
| 8 | 64.75 | 30.5 | 4.75 | | 1.595 | | | | | | 5,750 | 0.384 | 8.3 | 5.4 |
| 9 | 67.4 | 31.7 | 0.9 | | 1.659 | 4,470 | 3.6 | 3,930 | 16.8 | 0.521 | 7,480 | 0.489 | | |
| 10 | 67.4 | 31.7 | 0.9 | | 1.67 | 4,060 | 5.0 | 3,700 | 51.4 | 0.375 | 6,424 | 0.446 | 8.5 | 5.9 |
| 11 | 67.4 | 31.7 | 0.9 | | 1.63 | 3,800 | 5.0 | 3,410 | 33.9 | 0.339 | 6,165 | 0.421 | 8.5 | 5.3 |
| 12 | 67.4 | 31.7 | 0.9 | | 1.68 | 4,030 | 4.4 | 3,840 | 11.6 | 0.382 | 6,653 | 0.461 | 5.8 | 2.2 |
| 13 | 67.4 | 31.7 | 0.9 | | 1.66 | 3,920 | 4.8 | 3,570 | 21.6 | 0.370 | 6,276 | 0.396 | 9.3 | 3.6 |
| 14 | 67.4 | 31.7 | 0.9 | | 1.68 | 4,060 | 4.3 | 3,610 | 24.3 | 0.446 | 6,590 | 0.473 | 8.7 | 3.4 |
| 15 | 67.4 | 31.7 | 0.9 | | 1.645 | 3,880 | 5.1 | 3,590 | 26.4 | 0.331 | 6,076 | 0.377 | 8.5 | 3.9 |
| 16 | 67.4 | 31.7 | 0.9 | | 1.65 | 4,350 | 3.4 | 3,750 | 13.7 | 0.406 | 6,885 | 0.443 | 8.2 | 4.0 |
| 17 | 59.46 | 28.0 | 0.79 | 11.75 | 1.87 | 5,260 | 10.45 | 5,170 | 13.5 | 0.908 | 7,500 | 0.523 | 10.4 | 6.0 |
| 18 | 62.65 | 29.51 | 0.84 | 7.00 | 1.80 | 4,910 | 7.4 | 4,620 | 9.7 | 0.736 | 7,146 | 0.508 | 9.3 | 5.5 |

ᵃ Mean values of at least four test specimens per example.
ᵇ Mean values of at least five test specimens/example.
ᶜ Specimen broke. In all other examples, the specimens deflect but do not break. The indicated values are not the energy at breakage. The indicated level of energy, however, serves as a comparative value for the work needed to bend the various test specimens.

It will be understood that a wide variety of silica-filled compositions may be made within the ranges disclosed herein employing the teachings of my invention. Accordingly, the invention is not to be limited, except as set forth in the claims that follow.

ing a mixture of from about 30 to about 50 weight percent of polyethylene having an average molecular weight of at least 400,000 and from about 70 to 50 weight percent of silica which is substantially freed of moisture and characterized by a particle size of 40 microns or less to form a molten uniform dispersion, casting said dispersion while molten on a continuously advancing surface, rolling said cast dispersion under pressure to produce a sheet of uniform cross section.

13. The process of claim 12, wherein from about 1.0 to about 5.0 weight percent of polyisobutylene is uniformly blended into said dispersion before casting.

14. The process of claim 12, wherein a reinforcing laminate is applied continuously to said cast dispersion to form a composite sheet.

15. The process of claim 12, wherein a reinforcing laminate is applied to and sandwiched between layers of said cast dispersion.

16. The process of claim 14, wherein the reinforcing laminate is a metal foil.

17. The process of claim 14, wherein the reinforcing laminate is fiber glass.

References Cited
UNITED STATES PATENTS

| | | | |
|---|---|---|---|
| 3,416,990 | 12/1968 | Robinson | 161—162 X |
| 3,499,820 | 3/1970 | Desaulniers | 161—162 |
| 3,621,092 | 11/1971 | Hofer | 264—322 |
| 3,674,589 | 7/1972 | Schaab et al. | 156—245 |

WILLIAM A. POWELL, Primary Examiner

U.S. Cl. X.R.

156—246, 309, 324, 334; 161—88, 162, 168, 217; 264—257, 258, 319